(12) United States Patent
Jiang et al.

(10) Patent No.: US 9,405,329 B2
(45) Date of Patent: Aug. 2, 2016

(54) COVER STRUCTURE, METHOD FOR FABRICATING IT, AND TOUCH PANEL INCLUDING COVER STRUCTURE

(71) Applicant: TPK TOUCH SOLUTIONS (XIAMEN) INC., Xiamen (CN)

(72) Inventors: Yau-Chen Jiang, Jhubei (TW); Jianbin Yan, Purtian (CN); Defa Wu, Jinjiang (CN); Feng Chen, Xiamen (CN)

(73) Assignee: TPK Touch Solutions (Xiamen) Inc., Xiamen (CN)

( * ) Notice: Subject to any disclaimer, the term of this patent is extended or adjusted under 35 U.S.C. 154(b) by 227 days.

(21) Appl. No.: 14/016,137

(22) Filed: Sep. 2, 2013

(65) Prior Publication Data

US 2014/0063371 A1 Mar. 6, 2014

(30) Foreign Application Priority Data

Sep. 6, 2012 (CN) .......................... 2012 1 0327817

(51) Int. Cl.
*G06F 1/16* (2006.01)
*G06F 3/044* (2006.01)
*G06F 3/0354* (2013.01)

(52) U.S. Cl.
CPC .......... *G06F 1/1692* (2013.01); *G06F 3/03547* (2013.01); *G06F 3/044* (2013.01); *Y10T 156/1044* (2015.01); *Y10T 428/24802* (2015.01)

(58) Field of Classification Search
CPC ................... G06F 2203/04103; G06F 1/1692; G06F 3/044; G06F 3/03547; Y10T 156/1044; Y10T 428/24802

USPC .......... 345/173–178; 178/18.01–18.09, 18.11
See application file for complete search history.

(56) References Cited

U.S. PATENT DOCUMENTS

| | | | |
|---|---|---|---|
| 5,569,565 A * | 10/1996 | Kawakami | G03G 5/02 359/1 |
| 8,946,690 B2 * | 2/2015 | Lee et al. | 257/40 |
| 2011/0234519 A1 * | 9/2011 | Chan | G02F 1/13338 345/173 |
| 2012/0075209 A1 * | 3/2012 | Lee | G06F 3/044 345/173 |
| 2012/0113042 A1 * | 5/2012 | Bayramoglu et al. | 345/174 |
| 2012/0235928 A1 * | 9/2012 | Chang | H01L 27/323 345/173 |
| 2013/0093696 A1 * | 4/2013 | Huang et al. | 345/173 |
| 2013/0162552 A1 * | 6/2013 | Huang et al. | 345/173 |
| 2013/0163154 A1 * | 6/2013 | Xie et al. | 361/679.01 |

FOREIGN PATENT DOCUMENTS

JP 2003248553 A * 9/2003
TW M270178 7/2005

* cited by examiner

*Primary Examiner* — Amare Mengistu
*Assistant Examiner* — Jennifer Zubajlo
(74) *Attorney, Agent, or Firm* — Gokalp Bayramoglu; Paul Bendemire

(57) ABSTRACT

Provided is a cover structure used for a touch panel, including: a substrate and a masking layer buried in the substrate. The region where the masking layer is located defines a non-visible region of the touch panel. In addition, a method for fabricating the cover structure and a touch panel including the cover structure are also provided.

8 Claims, 5 Drawing Sheets

COVER STRUCTURE, METHOD FOR FABRICATING IT, AND TOUCH PANEL INCLUDING COVER STRUCTURE

BACKGROUND OF THE INVENTION

All related applications are incorporated by reference. The present application is based on, and claims priority from, China Application Serial Number No. 201210327817.0, filed on Sep. 6, 2012, the disclosure of which is hereby incorporated by reference herein in its entirety.

FIELD OF THE INVENTION

The present disclosure relates to touching techniques, and in particular to a cover structure used for a touch panel, a method for fabricating it, and a touch panel including the cover structure.

DESCRIPTION OF THE RELATED ART

Touch panels are widely used in electronic devices such as household products, communication devices and electronic information devices. Various physical input interfaces of these electronic devices, such as physical keyboards and mouse devices are gradually being replaced with touch panels to provide a more efficient operator interface.

In typical, the touch panels include a protection cover. The protection cover may protect a touch sensor of the touch panel and is provided for being directly touch-operated by the user. For a better appearance, a masking layer is formed on the surface of the protection cover. The masking layer may mask non-transparent components, such as the peripheral conductive traces of the touch panel. However, the height of the masking layer may result in a height gap formed on the surface of the protection cover, which is detrimental to the yield and quality of the touch panel.

For instance, referring to FIG. 1A, wherein a cross-sectional view of a touch panel according to the prior art is illustrated, the touch panel is made by adhering a touch sensor 103 to a protection cover 102. As shown in FIG. 1A, a masking layer 104 is formed on an adhering surface of the protection cover 102, and the touch sensor 103 adheres to the protection cover 102 by optical glue 106. The height H of the masking layer 104 on the protection cover 102 results in adhering bubbles 108 formed during the adhering process being difficult to remove.

FIG. 1B shows a cross-sectional view of another touch panel according to the prior art. The touch panel shown in FIG. 1B is made by directly forming a sensing electrode layer 124 that shall be originally formed on another substrate on the protection cover 102. However, the masking layer 104 is also formed on the protection cover 102 prior to the sensing electrode layer 124. The sensing electrode layer 124 can only be conformally formed over the protection cover 102 and the masking layer 104. The masking layer 104 is prone to generate impurities in the high-temperature environment of forming the sensing electrode layer 124, and the impurities may be detrimental to the characteristics of the sensing electrode layer 124. In addition, the sensing electrode layer 124 may easily be broken or interrupted at the interface 130 of the protection cover 102 and the masking layer 104 due to the height H' of the masking layer 104 on the protection cover 102.

BRIEF SUMMARY OF THE INVENTION

According to some embodiments of the present disclosure, a cover structure used for a touch panel is provided, including: a substrate; and a masking layer buried in the substrate, and a region where the masking layer is located defines a non-visible region of the touch panel.

According to some embodiments of the present disclosure, a method for fabricating a cover structure used for a touch panel is provided. The method includes: disposing a masking layer between a first transparent substrate and a second transparent substrate, where in a region where the masking layer is located defines a non-visible region of the touch panel; heating the first transparent substrate and the second transparent substrate to soften them such that the first transparent substrate and the second transparent substrate are fused to a substrate; and cooling the substrate for fixing the shape of the substrate.

According to some embodiments of the present disclosure, a touch panel is provided, including: a substrate; and a masking layer buried in the substrate, wherein a region where the masking layer is located defines a non-visible region of the touch panel; and a sensing electrode layer formed on at least one surface of the substrate.

According to some embodiments of the present disclosure, a touch panel is provided, including: a substrate; and a masking layer buried in the substrate, wherein a region where the masking layer is located defines a non-visible region of the touch panel; and a touch sensor adhered to a surface of the substrate by optical glue.

Hereby, in the condition of the touch panel wherein, since the masking layer is buried in the substrate, the substrate may have a flat surface. The residue of adhering bubbles may be reduced when the touch sensor is adhered to the flat surface of the substrate. The yield and quality of the touch panel may be significantly improved.

BRIEF DESCRIPTION OF THE DRAWINGS

The disclosure will now be described by way of example with reference to the accompanying drawings, in which.

DETAILED DESCRIPTION

Figure 1A:
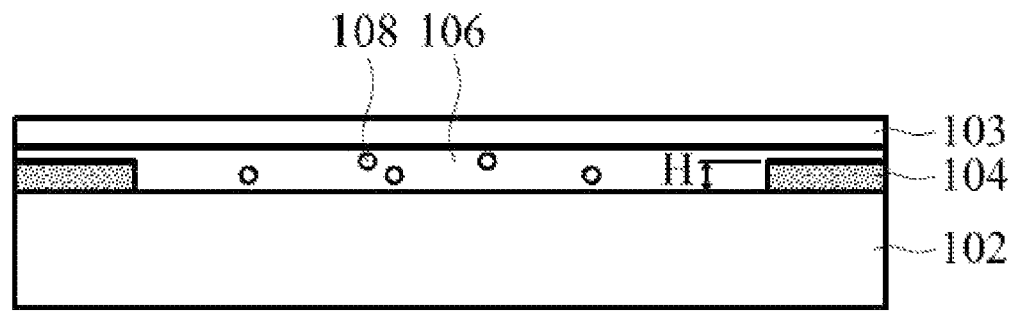
FIGS. 1A and 1B show cross-sectional views of touch panels according to the prior art.
Figure 1B:
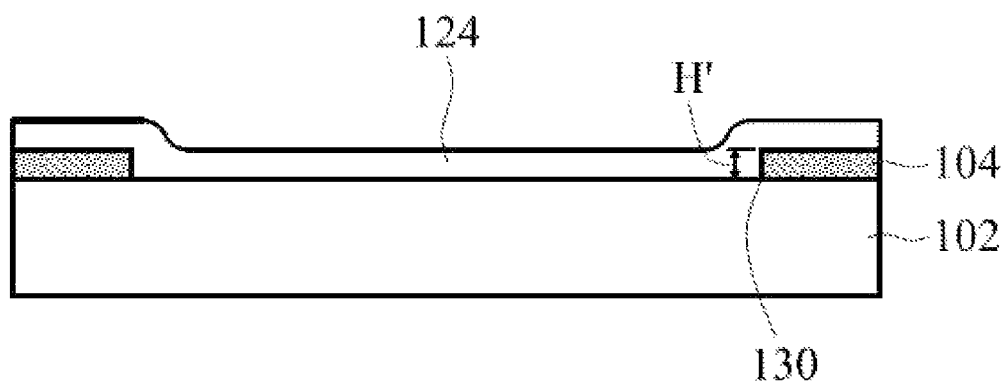

In the following detailed description, for the purpose of explanation, numerous specific details are set forth in order to provide a thorough understanding of the disclosed embodiments. It will be apparent, however, that one or more embodiments may be practiced without these specific details. In other instances, well-known structures and devices are shown schematically in order to simplify the drawing.

Figure 2A:
FIGS. 2A to 2D show cross-sectional views of a cover structure at the intermediate stages of fabrication according to an embodiment of the disclosure.

FIGS. 2A-2D show cross-sectional views of a cover structure at the intermediate stages of fabrication according to an embodiment of the disclosure. The cover structure of the present embodiment may be used for a touch panel. For example, the cover structure may be used as a cover lens of the touch panel and may define the visible region and the non-visible region of the touch panel. Referring to FIG. 2A, a first transparent substrate 202A is provided first. In an embodiment, the first transparent substrate 202A may be a transparent glass substrate. The first transparent substrate 202A may have a thickness in the range of 0.1 to 0.7 mm. The first transparent substrate 202A may have a glass transition temperature of between about 450° C. and 800° C. In some embodiments, the material of the first transparent substrate 202A may be a thermoplastic material, including but not limited to polyacrylate.

Figure 2B:
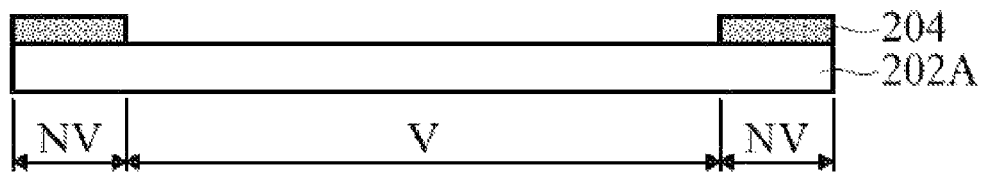

Afterwards, referring to FIG. 2B, a masking layer 204 is formed on the first transparent substrate 202A. The masking layer 204 may be formed of a masking material having an optical density of no greater than 7. The masking material may include ink, carbon paste, graphite or a combination thereof. The masking layer 204 may be black or include other suitable colors. It should be noted that the masking layer 204 may sustain high temperatures. For example, the masking layer 204 will not be deformed and transformed at a temperature higher than the glass transition temperature of the first transparent substrate 202A.

More specifically, the region where the masking layer 204 is located, defines the non-visible region NV of the touch panel. The masking layer 204 may mask non-transparent components such as peripheral conductive traces located in the non-visible region NV. In practice, the masking layer 204 may be formed on the peripheral region or other regions over a surface of the first transparent substrate 202A according to design requirements. The masking layer 204 may have a square-frame shape, a strip shape, an L-shape, or another suitable shape. Regions of the touch panel other than the non-visible region NV may be defined as the visible region V. In some embodiments, the masking layer 204 may have a thickness of between 1/100 and 1/10 of that of the first transparent substrate 202A. For example, the masking layer may have a thickness in the range of about 7 to about 10 μm.

Figure 2C:
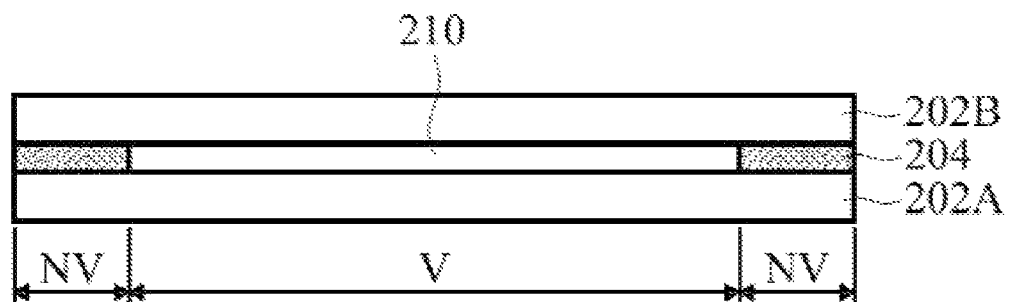

Afterwards, referring to FIG. 2C, a second transparent substrate 202B is disposed over the masking layer 204 such that the masking layer 204 is located between the first transparent substrate 202A and the second transparent substrate 202B. At this stage, due to the thickness of the masking layer 204, a gap 210 is formed in the visible region V and between the first transparent substrate 202A and the second transparent substrate 202B. In this embodiment, the first transparent substrate 202A and the second transparent substrate 202B may be formed of the same material for having the same material transition temperature. In some embodiments, the second transparent substrate 202B may have a thickness that is the same as the thickness (e.g., from about 0.1 to about 0.7 mm) of the first transparent substrate 202A.

Figure 2D:
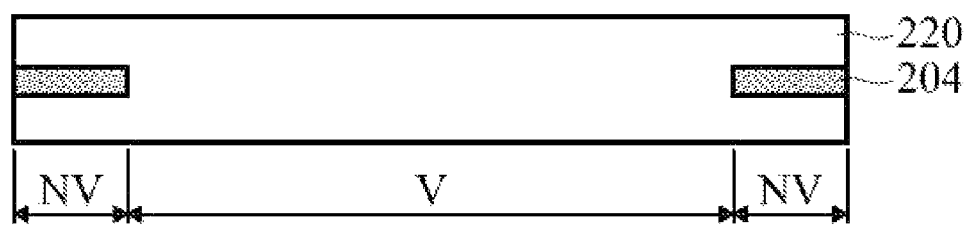

Finally, referring to FIG. 2D, the first transparent substrate 202A and the second transparent substrate 202B are heated to a temperature higher than their material transition temperature for softening the first transparent substrate 202A and the second transparent substrate 202B. The first transparent substrate 202A and the second transparent substrate 202B are fused to each other and form a substrate 220. The substrate 220 is then cooled and set. In the above fusing process, the softened first transparent substrate 202A and second transparent substrate 202B may conformally fill the gap 210 and wrap the masking layer 204. Therefore, the masking layer 204 is buried in the substrate 220. In other words, the first transparent substrate 202A and the second transparent substrate 202B may be bonded to each other without any glue, and the masking layer 204 is completely wrapped by the substrate 220 which is formed by the fusing process.

In some embodiments, when fabricating the cover structure, the first transparent substrate 202A and the second transparent substrate 202B may be supported by a mold having a flat supporting surface (not shown). The shape of the substrate 220 may be molded by using pressure molding at the fusion process and then fixed after cooling. Since the softened first transparent substrate 202A and second transparent substrate 202B are highly molded, the substrate 220 may have flat surfaces by using the mold having the planar supporting surface with applied pressure. In an embodiment, the processes shown in FIGS. 2A to 2D may be performed under a vacuum environment for avoiding the formation of bubbles during the fusion process. Accordingly, the quality of the substrate 220 may be better ensured.

In some embodiments, the substrate 220 formed according to the processes described above is used as the cover lens structure of the touch panel. In addition, the substrate 220 may be strengthened further after its shape has been fixed such that more solid protection of the substrate 220 is provided. In an embodiment, the strengthening process may include a chemical ion-exchange process.

In the following descriptions, some embodiments of a touch panel including the cover structure described above are illustrated. The terms "on", "over", "under" and "below" are merely used to recite one position with respect to another position. For example, in view of the figures of the present disclosure, a position over the touch panel is relatively closer to the user, and another position below the touch panel is relatively farther away from the user.

Figure 3A:
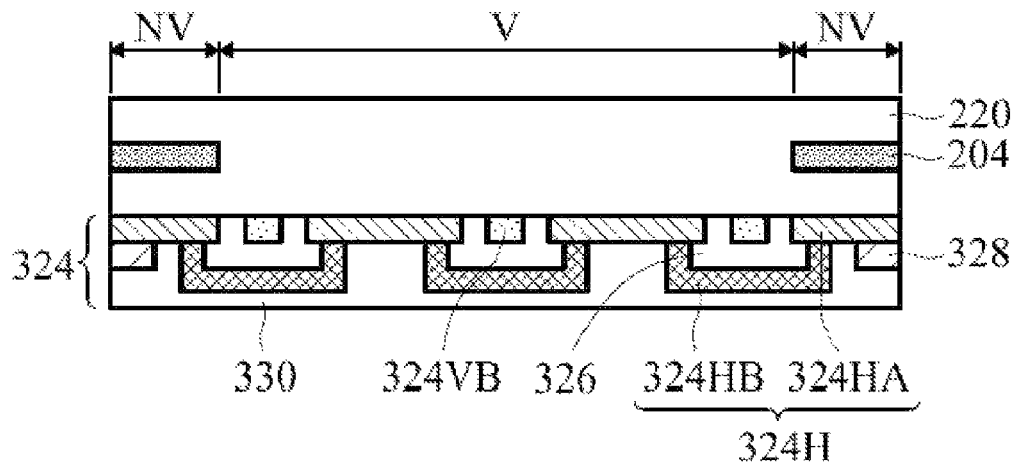
FIGS. 3A and 3B respectively show a cross-sectional view and a top view of a touch panel according to an embodiment of the disclosure.
Figure 3B:
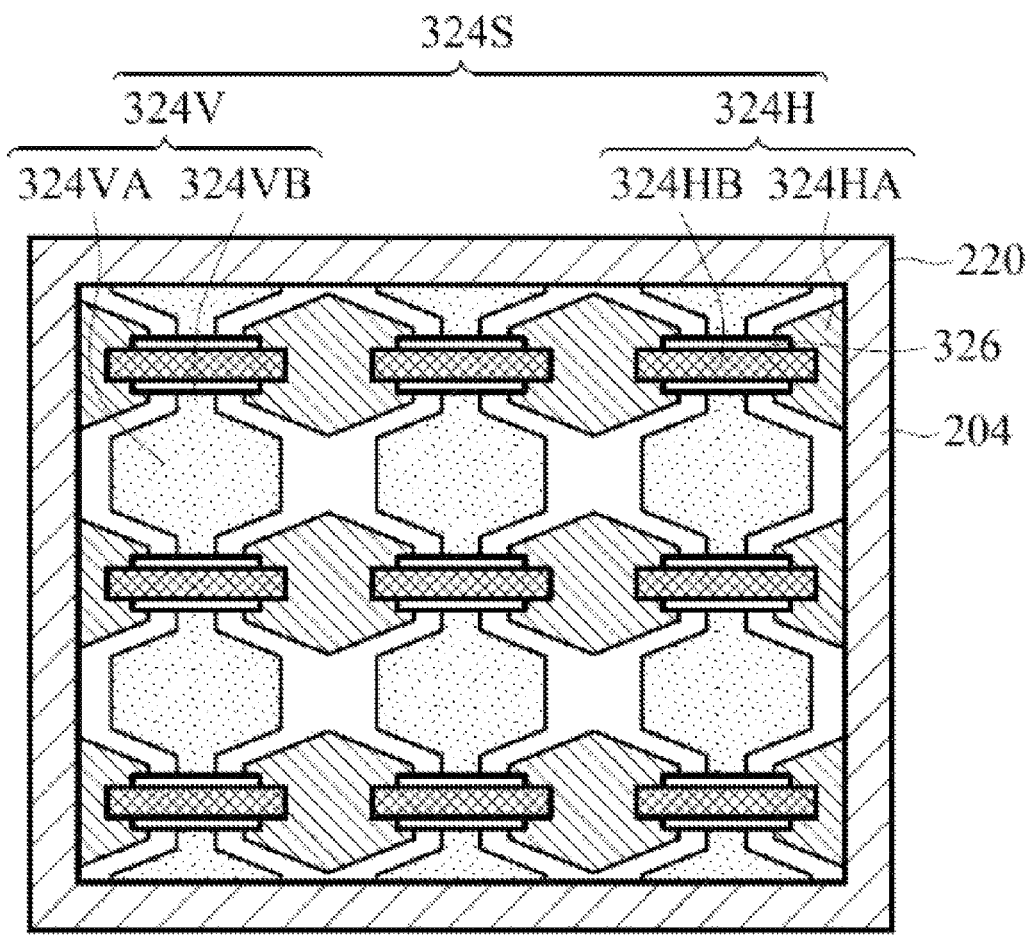

FIGS. 3A and 3B respectively show a cross-sectional view and a top view of a touch panel according to an embodiment of the present disclosure. The touch panel may include a substrate 220, a masking layer 204 buried in the substrate 220, and a sensing electrode layer 324 formed on at least one surface of the substrate 220. In this embodiment, a location where the masking layer 204 is buried is not particularly limited. For example, the masking layer 204 buried in the substrate 220 is located in a peripheral region, as in the preceding embodiments, or in another suitable region. In addition, the pattern of the masking layer 204 is also not particularly limited. In this embodiment, the sensing electrode layer 324 may be directly formed on a planar lower surface of the substrate 220 by a photolithography process or a printing process. The substrate 220 may be a strengthened substrate 220 which may support and protect the sensing electrode layer 324 and is able to be directly touch-operated by the user.

The sensing electrode layer 324 may include a sensing electrode array 324S with signal traces 328. The signal traces 328 may be located in the non-visible region NV defined by the masking layer 204 and electrically connected to the sensing electrode array 324S. The signal traces 328 may transmit the signals between the sensing electrode array 324S and other circuits (not shown). Moreover, regions of the touch panel other than the non-visible region NV where the masking layer 204 is located is defined as a visible region V.

The sensing electrode array 324S may include a plurality of first sensing electrode lines 324V which arranged along a first axis and a plurality of second sensing electrode lines 324H which arranged along a second axis. The first sensing electrode lines 324V and the second sensing electrode lines 324H are isolated from each other. More specifically, each of the first sensing electrode lines 324V may include a plurality of first conductive elements 324VA and a plurality of first connection lines 324VB. Adjacent first conductive elements 324VA on the first axis are electrically connected and linked by the first connection line 324VB. Each of the second sensing electrodes 324H may include a plurality of second conductive elements 324HA and a plurality of second connection lines 324HB. Adjacent second conductive elements 324HA on the second axis are electrically connected and linked by the second connection line 324HB. In some embodiments, the first connection lines 324VB and the second connection lines 324HB are intercrossed.

In some embodiments, the sensing electrode layer 324 further includes an insulating layer 326 and a protection layer 330. The insulating layer 326 is disposed between the first connection lines 324VB and the second connection lines 324HB at each of the intersections of the first connection lines 324VB and the second connection lines 324HB, for electrically isolating the first electrode 324V from the second electrode 324H. The protection layer 330 is disposed over the first sensing electrode lines 324V, the second sensing electrode lines 324H and the signal traces 328, for protecting the first sensing electrode lines 324V, the second sensing electrode 324H and the signal traces 328 from being physically or chemically changed. Accordingly, the first sensing electrode lines 324V and the second sensing electrode lines 324H in the visible region V of the touch panel may provide touch-sensing functions.

The above embodiment in which a sensing electrode layer 324 is directly formed on the substrate 220, is merely used for illustration, and is not meant to limit the scope of the disclosure. It is recognized and understood that the scope which the disclosure seeks to protect may cover various modifications within the spirit of the disclosure.

As described above, since the masking layer 204 is buried in the substrate 220 (i.e., the masking layer 204 is not in contact with the upper surface and lower surface of the substrate 220), the substrate 220 may have a flat surface to sustain the sensing electrode layer 324. The possibility of breakage or interruption of the sensing electrode layer 324 is therefore reduced. In addition, there is no need to be concerned that the impurities would diffuse to the sensing electrode layer 324 in the high-temperature process of forming the sensing electrode layer 324. The yield and the quality of the touch panel may be significantly improved. In addition, the non-visible region NV of the touch panel defined by the masking layer 204 may successfully mask the non-transparent components such as the signal traces 328 of the sensing electrode layer 324.

Figure 4A:
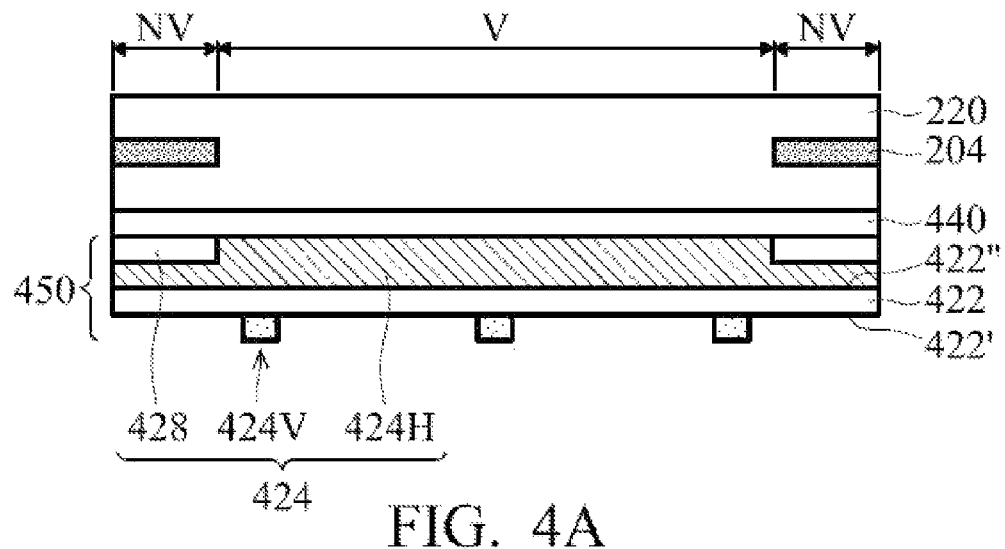
FIGS. 4A and 4B respectively show a cross-sectional view and a top view of a touch panel according to another embodiment of the disclosure.
Figure 4B:
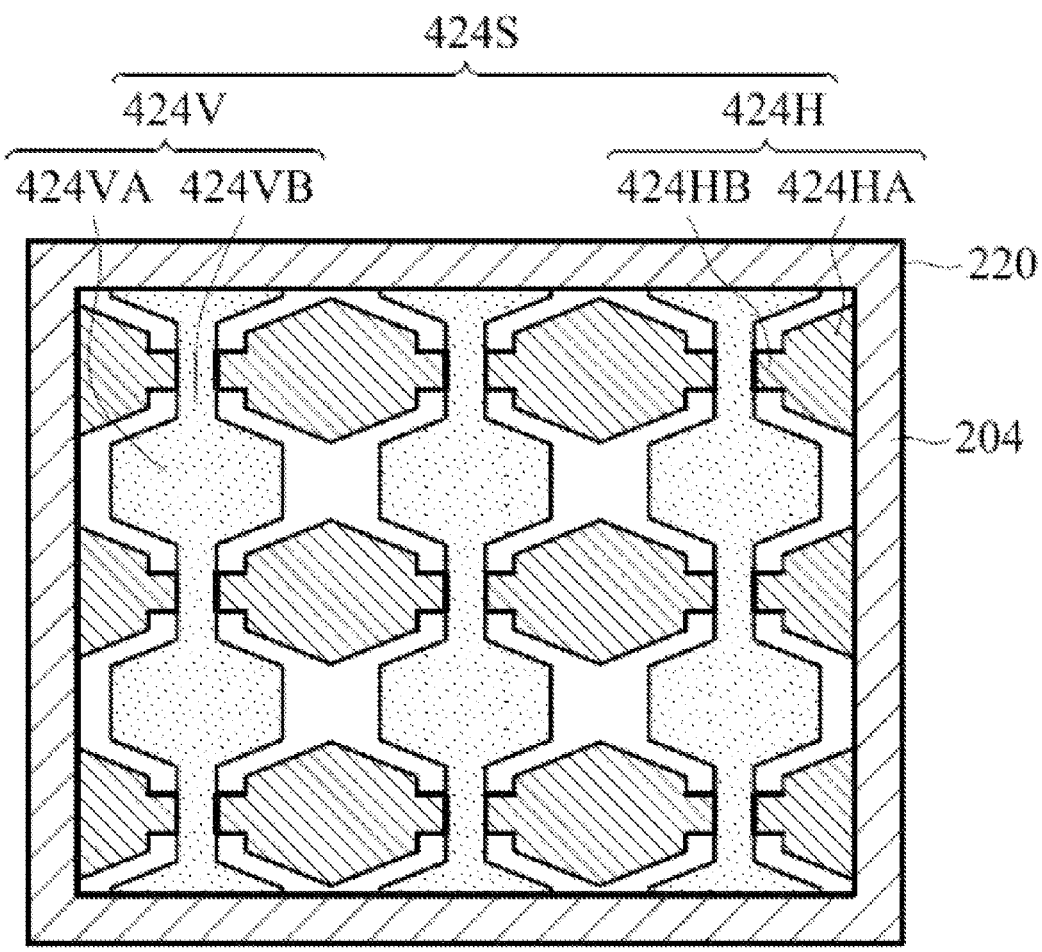

FIGS. 4A and 4B respectively show a cross-sectional view and a top view of a touch panel according to another embodiment of the present disclosure. In this embodiment, the touch panel may include a substrate 220, a masking layer 204 buried in the substrate 220, and a touch sensor 450 adhered to a surface of the substrate 220. In an embodiment, the touch sensor 450 adheres to the substrate 220 by optical glue 440. The optical glue 440 may be liquid glue or solid glue. The touch panel of this embodiment is the same as the touch panel shown in FIGS. 3A and 3B, except that the touch sensor 450 is adhered onto the flat surface of the substrate 220. In some embodiments, the substrate 220 may be a strengthened substrate 220. The strengthened substrate 220 may protect the touch sensor 450 so that the touch panel can be directly touch-operated by the user.

The touch sensor 450 may include a carrier substrate 422 and a sensing electrode layer 424. The carrier substrate 422 may be made of glass or polyester film. The sensing electrode layer 424 is formed on at least one surface of the carrier substrate 422. The sensing electrode layer 424 includes a sensing electrode array 424S with signal traces 428. The signal traces 428 are electrically connected to the sensing electrode array 424S and are disposed in the non-visible region NV defined by the masking layer 204. The signal traces 428 may be used to transmit signals between the sensing electrode array 424S and other circuit components (not shown).

The sensing electrode array 424S may include a plurality of first sensing electrode lines 424V which arranged along a first axis and a plurality of second sensing electrode lines 424H which arranged along a second axis. The first sensing electrode lines 424V and the second sensing electrode lines 424H are electrically isolated from each other. As such, the first sensing electrode lines 424V and the second sensing electrode lines 424H may provide the functions of touch sensing.

More specifically, in this embodiment, the first sensing electrode lines 424V and the second sensing electrode lines 424H are formed on an upper surface 422' and a lower surface 422", respectively. The first sensing electrode lines 424V and the second sensing electrode lines 424H are electrically isolated by the carrier substrate 422. In addition, each of the first sensing electrode lines 424V includes a plurality of first conductive elements 424VA and a plurality of first connection lines 424VB. Adjacent first conductive elements 424VA on the first axis are electrically connected and linked by the first connection line 424VB. Each of the second sensing electrode lines 424H includes a plurality of second conductive elements 424HA and a plurality of second connection lines 424HB. Adjacent second conductive elements 424HA on the second axis are electrically connected and linked by the second connection lines 424HB. The first connection lines 424VB and the second connection lines 424HB are intercrossed.

As described above, the sensing electrode lines 424V and 424H at different axis are formed on the upper surface 422' and lower surface 422" of the carrier substrate 422, respectively. However, in some other embodiments, the sensing electrode lines 424V and 424H may be designed as per the configuration shown in FIGS. 3A and 3B. For example, the sensing electrode lines 424V and 424H may also be formed on the same surface of the carrier substrate 422, and they may be electrically isolated from each other by an insulating layer. Also, the sensing electrode lines, the insulating layer, and the signal traces may be protected by a protection layer. The configuration of the sensing electrode layer 424 described above is only an illustration for explaining the total structure of the touch panel, and is not meant to limit the scope of the disclosure.

As described above, since the masking layer 404 is buried in the substrate 220 (i.e., the masking layer 204 is not in contact with the upper surface and the lower surface of the substrate 220), the substrate 220 may have a flat surface. The residue of adhering bubbles may be reduced when the touch sensor 450 is adhered to the flat surface of the substrate 220. The yield and quality of the touch panel may be significantly improved. In addition, there is no outer masking layer formed on the surface of the substrate. The total thickness of the touch panel is reduced, and there is no need to be concerned about the height of the outer masking layer. In addition, the non-visible region NV defined by the position of the masking layer 204 may successfully mask non-transparent components, such as the signal traces 428 of the sensing electrode layer 424 of the touch sensor 450.

While the embodiments have been described above, it will be recognized and understood that various modifications can be made to the disclosure and the appended claims are intended to cover all such modifications which may fall within the spirit and scope of the disclosure.

What is claimed is:

1. A method for fabricating a cover structure used for a touch panel, the method comprising:
disposing a masking layer between two transparent substrates, wherein a gap is defined between the two transparent substrates;

heating the two transparent substrates to soften the two transparent substrates such that the two transparent substrates are fused to fill the gap and to wrap the masking layer; and cooling the two softened transparent substrates to form a merged substrate.

2. The method of claim 1, further comprising strengthening the merged substrate after the step of cooling the two softened transparent substrates.

3. The method of claim 1, wherein the two transparent substrates have a material transition temperature.

4. The method of claim 3, wherein the heating step comprises heating the two transparent substrate to a first temperature higher than the material transition temperature, and wherein the masking layer is not deformed at the first temperature.

5. The method of claim 1, wherein the merged substrate is molded by a pressure molding.

6. The method of claim 1, wherein the merged substrate is formed with the proviso that glue is not provided between the two transparent substrates.

7. The method of claim 1, wherein the method is performed under a vacuum environment.

8. The method of claim 1, wherein the two transparent substrates are made of a thermoplastic material.

* * * * *